US009111130B2

United States Patent
Heckman

(10) Patent No.: US 9,111,130 B2
(45) Date of Patent: Aug. 18, 2015

(54) FACILITATING FACE DETECTION WITH USER INPUT

(75) Inventor: Nicholas T. Heckman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 276 days.

(21) Appl. No.: 13/178,768

(22) Filed: Jul. 8, 2011

(65) Prior Publication Data

US 2013/0011024 A1 Jan. 10, 2013

(51) Int. Cl.
*G06K 9/00* (2006.01)

(52) U.S. Cl.
CPC ........ *G06K 9/00248* (2013.01); *G06K 9/00221* (2013.01); *G06K 9/00228* (2013.01); *G06K 9/00288* (2013.01); *G06K 9/00597* (2013.01)

(58) Field of Classification Search
CPC .......... G06K 9/00288; G06K 9/00248; G06K 9/00228; G06K 9/00221; G06K 9/00597
See application file for complete search history.

(56) References Cited

U.S. PATENT DOCUMENTS

| | | | |
|---|---|---|---|
| 7,620,242 B2 * | 11/2009 | Enomoto et al. | 382/167 |
| 7,809,171 B2 | 10/2010 | Solinsky et al. | |
| 2003/0223622 A1 * | 12/2003 | Simon et al. | 382/118 |
| 2004/0161134 A1 * | 8/2004 | Kawato et al. | 382/118 |
| 2004/0170337 A1 * | 9/2004 | Simon et al. | 382/254 |
| 2004/0179719 A1 * | 9/2004 | Chen et al. | 382/118 |
| 2005/0163498 A1 * | 7/2005 | Battles et al. | 396/158 |
| 2005/0207649 A1 * | 9/2005 | Enomoto et al. | 382/190 |
| 2005/0220347 A1 * | 10/2005 | Enomoto et al. | 382/190 |
| 2006/0115161 A1 | 6/2006 | Kee et al. | |
| 2006/0257132 A1 * | 11/2006 | Shiffer et al. | 396/158 |
| 2010/0172577 A1 * | 7/2010 | Matsushita et al. | 382/165 |
| 2012/0070041 A1 * | 3/2012 | Wang | 382/118 |

OTHER PUBLICATIONS

Fasel, I., Fotenberry, B., and Movellan, J., A generative framework for real time object detection and classification, 2005, Computer Vision and Image Understanding, vol. 98, pp. 182-210.*

Campadelli, P., Cusmai, F., Lanzarotti, R., A Color-based Method for Face Detection, 2003, International Symposium on Telecommunications, pp. 1-5.*

Youmaran, et al., "Using red-eye to improve face detection in low quality video images", Retrieved at <<http://ieeexplore.ieee.org/stamp/stamp.jsp?tp=&arnumber=4054550>>, Canadian Conference on Electrical and Computer Engineering, May 2006, pp. 1940-1943.

(Continued)

*Primary Examiner* — Stephen R Koziol
*Assistant Examiner* — Jonathan S Lee
(74) *Attorney, Agent, or Firm* — Bryan Webster; Kate Drakos; Micky Minhas

(57) ABSTRACT

One or more techniques and/or systems are disclosed for improving face detection in an image. A user may select a first eye location while viewing the image (e.g., per red-eye reduction) and a first indication of user input, comprising the location selected by the user, can be received. The first eye location in the image can then be used to determine a face location in the image (and a second user indicated eye location can be used as well). The location of the face can be identified in the image, and the image with the identified face location can be provided to a face detection and/or recognition operation, for example.

20 Claims, 6 Drawing Sheets

(56) References Cited

OTHER PUBLICATIONS

Sohail, et al., "Detection of Facial Feature Points Using Anthropometric Face Model", Retrieved at <<http://citeseerx.ist.psu.edu/viewdoc/download;jsessionid=1AC9FE4BF2D243069CD8BODAD138A2CC?doi=10.1.1.96.230&rep=rep1&type=pdf>>, 2006, pp. 656-665.

Guo, et al., "Human Face Recognition Using a Spatially Weighted Hausdorff Distance", Retrieved at <<http://repository.lib.polyu.edu.hk/jspui/bitstream/10397/262/1/IEEE_HUMAN_FACE_p11.pdf>>, IEEE International Symposium on Circuits and Systems, vol. 2, May 6-9, 2001, pp. 145-148.

Huang, et al., "Tracking of Multiple Faces for Human-Computer Interfaces and Virtual Environments", Retrieved at <<http://www.cs.bgu.ac.il/~orlovm/storage/face-tracking.pdf>>, IEEE International Conference on Multimedia and Expo, vol. 3, 2000, pp. 4.

Nefian, et al., "Real-Time Detection of Human Faces in Uncontrolled Environments", Retrieved at <<http://www.anefian.com/research/nefian97_real.pdf>>, Proceedings of SPIE conference on Visual Communications and Image Processing, Jan. 10, 1997, pp. 9.

James, Mike, "Face Recognition", Retrieved at <<http://www.i-programmer.info/babbages-bag/1091-face-recognition.html>>, Retrieved Date: Mar. 24, 2011, pp. 3.

"Face Recognition Comes to Facebook Photos", Retrieved at <<http://magnetfish.com/face-recognition-comes-to-facebook-photos-1/>>, Dec. 16, 2010, pp. 4.

\* cited by examiner

FACILITATING FACE DETECTION WITH USER INPUT

BACKGROUND

In a computing environment, users commonly collect and manage digital images. For example, a user may capture an image using a camera, download the image to a computer, and save descriptive information with the image (e.g., metadata). Image management applications allow users to make adjustments to an image, such as by adjusting image characteristics to enhance image quality (e.g., brightness, contrast, and/or color in the image). A user may also enhance the image by adding features that were not found in the captured subject, and/or to mitigate undesirable effects or eliminate undesired features. Further, some image management applications may be able to detect features in an image, such as human face detection, which may also be used to retrieve data associated with image features, such as names associated with recognized faces.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Currently, several image management applications use a face detection system to find faces in images and then utilize a face recognition system to compare detected faces to known examples. As an example, if a detected face is recognized to have a close resemblance to a known face, then a recommendation for descriptive information, such as a name, corresponding to the known face can be provided to the user (e.g., in a UI identifying the detected face). For example, an image management application may scan images stored by a user to detect faces, then run detected faces through facial recognition that compares detected face image data to known face image data (e.g., stored locally or remotely). In this example, tags that comprise information associated with a known face can be provided when a match is identified for the detected face.

Face detection operations often do not detect a face even when present in the image (e.g., false negatives). For example, the characteristics for the undetected face may not meet threshold requirements for face detection for a variety of reasons. For example, the undetected face may be oriented in a manner that does not allow for detection, the face may be obscured by an object or shadow, and/or the image may be unfocused. Further, when the face is not detected by an automated face detection operation, for example, then a name-suggestion for the face may not be made using face recognition. However, humans can typically detect a human face in an image, even when a facial detection application cannot.

Accordingly, one or more techniques and/or systems are disclosed where human interaction with an image may provide input that can be used to improve face detection in the image. When a user interacts with the image to enhance or adjust it, they may be providing indications of a location of an undetected face in the image. For example, users often apply a red-eye reduction operation to the image, when the red-eye effect causes glowing pupils (e.g., from a camera flash reflecting off of blood vessels in the back of the eye). In this example, when the user selects or interacts with an eye to apply the red-eye reduction, this interaction can identify a location of an eye in the image. Because eyes are typically associated with faces, a location of the face may be inferred from the user interaction, for example. The face location information may, for example, be used in a subsequent face detection operation to detect a previously undetected face and/or a facial recognition operation.

In one embodiment of improving face detection in an image, a first indication of user input is received, where the first indication comprises a first eye location in the image. Further, the first location of the eye, comprised in the first indication, may be used to determine a face location in the image. Additionally, the location of the face can be indicated in the image, and the image with the indicated face location can be provided for a face detection operation.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
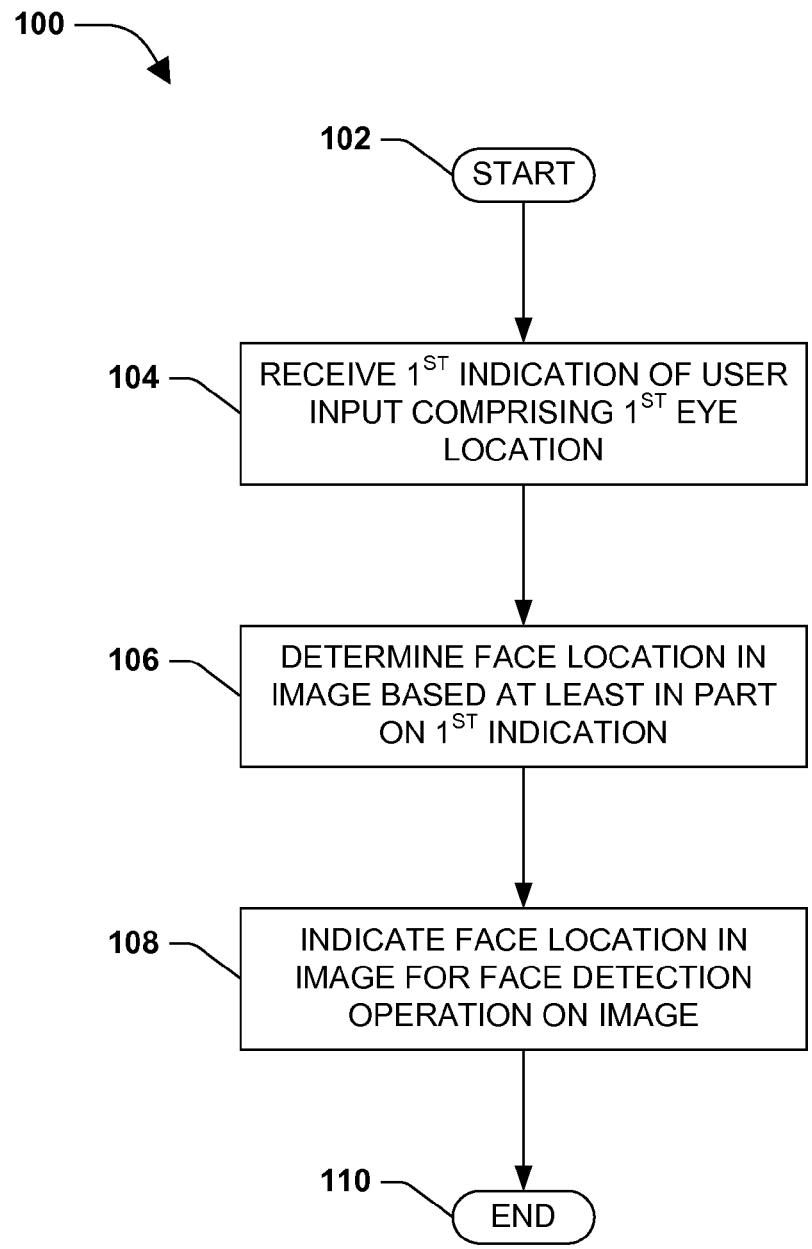
FIG. 1 is a flow diagram illustrating an exemplary method for improving face detection in an image.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that provides for facilitating face detection in digital images, for example, which may lead to improved face recognition. Currently, some image management applications provide for tagging (e.g., applying associated data, such as a name, to) a portion of an image, such as a face. As an example, a user of an image management application may review an image, select a portion of the image comprising a face, and enter a name associated with the face (e.g., the person's name). Further, some image management applications can automatically detect a facial region in an image, for example, proving the user with an enhanced experience when deciding whether to tag the people in the image.

Additionally, some image management applications can automatically recognize the face detected by the detection process, for example, and can provide the associated data (e.g., the tag) to the user without the user having to enter information. However, the facial detection operation may not always succeed in detecting a face in the image, for example, which may also prevent the face recognition operation from proceeding as expected by the user. This may lead to a diminished user experience, for example, requiring the user to manually select regions in the image, and manually apply tags.

FIG. 1 is a flow diagram illustrating an exemplary method 100 for improving face detection in an image. The exemplary method 100 begins at 102 and involves receiving a first indication of user input, where the first indication comprises a first eye location in the image. As an example, when a user interacts with an image, such as to adjust image characteristics, the user may identify a portion of the face, such as the eyes. For example, users often apply red-eye reduction to images when a red-eye effect produces a red glow in the pupils of people and some animals.

In one embodiment, when the user applies the red-eye reduction (e.g., manually or using an image manipulation application) to the image they identify a location of one or more eyes. In this embodiment, the indication of the user input can comprise the identification of the eye location by the red-eye reduction application. In other embodiments, the eye location may be identified by the user in other ways. For example, the user may wish to change a color of the pupil of the eyes, and/or may wish to make the eyes shine more. In one embodiment, an application used to manipulate an image can identify when the user interacts with an eye, thereby identifying its location. For example, the user may select an operation in the application that is used merely for eyes in the image (e.g., red-eye reduction, and/or other enhancements), and subsequently select the location of an eye in the image. Alternatively, other operations and/or applications that are not specifically related to, limited to, etc. one or more eyes may nevertheless yield eye location, such as via user input, for example.

A 106 in the exemplary method 100, using the first indication, a face location is identified in the image. As an example, because an eye is known to be associated with a face, and the eye is known to be located in a particular position relative to an area comprising the face, a face location in the image may be determined from the location of the first eye. In one embodiment, an estimated location of the face in the image may be inferred based on known geometries of a human face, such as the location of eyes relative to the location of the face. In one embodiment, the estimated location of the face may comprise a default area size (e.g., comprising a fixed, predetermined, etc. pixel area) comprising the location of the first eye identified from the first indication.

For example, the first indication may comprise a user selected area (e.g., covering a plurality of pixels) of the image identifying the first eye, or may comprise merely a location selected by the user (e.g., comprising merely a pixel) identifying the location of the first eye in the image. In this example, an estimated location of the face can comprise a default sized area (e.g., merely one pixel, or a square of pixels of a desired size) of the image, where the eye location is situated at a center (or an offset) of the default area. Because an orientation of the face may not be readily inferred from merely one eye location, for example, placing the eye location in the center of the estimated face location area may be able to encompass at least a desired amount of the face in the image. In this way, in this example, regardless of the actual location of the face in the image, it (e.g., or a portion thereof) will likely be comprised in the identified face location.

At 108 in the exemplary method 100, the face location is indicated in the image for a face detection operation on the image. For example, the face location identified from the first eye location can be provided to a face detection application. In this example, the face detection application can use the face location indicated in the image as a starting point to attempt to detect the face. While face detection applications have improved they commonly miss detecting a face in an image, for example, where the particular parameters used by the application for detecting a face are not met.

As an example, detection of a face is commonly missed when the orientation of the face is not within a specified alignment (e.g., rotated), the face is partially in profile, a portion of the face is obscured (e.g., by shadow or an object), and/or if partially out of focus. In one embodiment, a second (e.g., or third, etc.) face detection operation attempt can be performed on the image comprising the indicated face location, for example, thereby providing additional information to the application that may not have been available during a first attempt at face detection. In this way, for example the face detection operation may be more likely to detect the face by using the indicated location of the face. It may be appreciated that one or more different thresholds, parameters and/or values, etc. may be used for a face detection operation when an indication of face location is provided (as opposed to when an indication of face location is not provided). For example, if a face detection operation was performed on an image and no faces were detected, then running that same operation on merely a portion of the image (e.g., indicated as potentially comprising an face based upon user input, such as red-eye reduction) may produce the same results (e.g., false negative). However, if requirements for detecting a face were altered (e.g., lowered) because user input provides an indication of a location in the image where a face is likely located due to user interaction with the image for red-eye reduction purposes, for example, then a face may more likely be detected (e.g., fewer false negatives). That is, less stringent face detection requirements may be acceptable, for example, in view of preliminary evidence (e.g., from a user) that a face exists at a certain location in the image (e.g., the user input tempers the likelihood of false positives (of detecting a face where no face exists) that may otherwise occur if lesser face detection standards were implemented).

Having indicated the face location in the image for a face detection operation on the image, the exemplary method 100 ends at 110.

Figure 2:
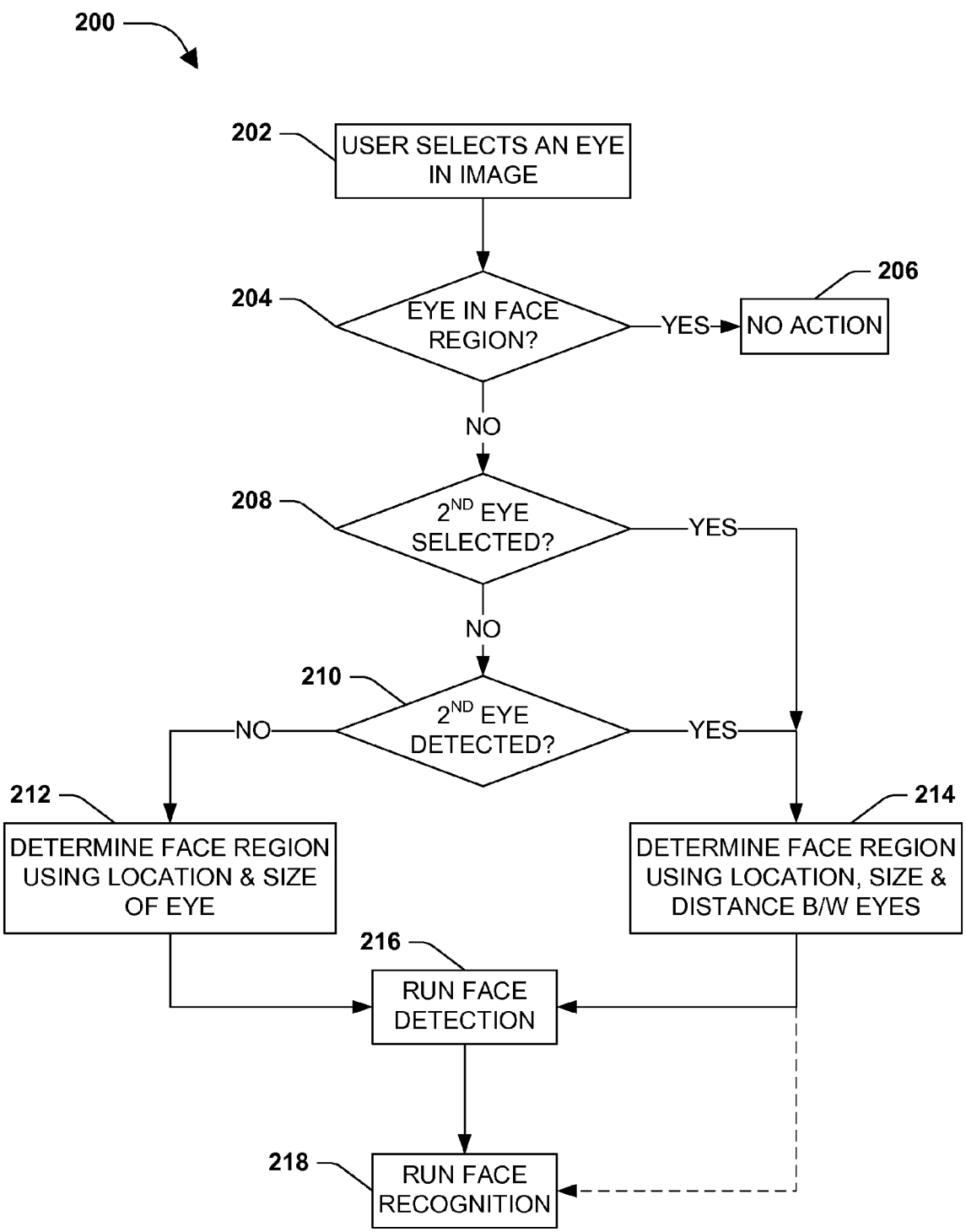
FIG. 2 is a flow diagram illustrating an example embodiment where one or more portion of one or more techniques described herein may be implemented.

FIG. 2 is a flow diagram illustrating an example embodiment 200 where one or more portion of one or more techniques described herein may be implemented. At 202, a user selects a portion of an image that comprises a first eye (e.g., of a person captured by the image). In one embodiment, the user selection of the first eye can comprise selecting a first eye location as well as a first eye size. For example, using an image management application, the user can select an area of the image, comprising the first eye, which has a red-eye effect in the pupil of the eye. In this example, when selecting the pupil, the user may select a plurality of pixels in the image that comprise the pupil.

Further, the area of the image selected by the user can be used to determine a size of the eye, such as using known human face geometry. For example, the user may select an ellipse that comprises the pupil (e.g., or the eye) in the image. In this example, the area of the selected ellipse can be determined (e.g., in pixels, or some measurement units) and the size of the eye may be inferred based on known human (e.g., or non-human) eye size. In this way, the first indication of user input can comprise both the first eye location and the first eye size.

At 204, the first eye location can be compared with known face regions in the image to determine whether the first eye location is comprised in a previously detected facial region. For example, the image may have previously been run through a face detection operation (e.g., prior to the user selecting the first eye), which may have identified one or more face regions in the image. If the selected first eye is located in a previously detected facial region (YES at 204) no further action may be taken, at 206. For example, the user may be performing image enhancement operations on previously detected facial regions, selecting the eye for red-eye reduction. In this example, because the face has already been detected, no further face detection may be necessary.

If the selected first eye is not located in a previously detected facial region (NO at 204), information regarding a second eye may be identified. In one embodiment, a second indication of user input may be received that comprises a second eye location in the image. Further, in one embodiment, the second indication may comprise a second eye size. As described above for the first eye, for example, the user may select the second eye in the image to perform some image enhancement operations. In this example, the eye location, and/or the eye size may be determined by the user selection of the second eye.

At 208, if the second eye is selected, and the location (e.g., and size) of the second eye is indicated (YES at 208), the location of a face region in the image may be determined using the location and size of the first and second eyes, along with a distance between the first and second eyes, at 214. In one embodiment, the face location may be determined using the first indication and the second indication if a distance between the first eye location and the second eye location meets a desired distance threshold. For example, in order for appropriate face location identification to occur, the first and second eyes should be from the same face.

In this embodiment, for example, a threshold distance may be used to determine whether the first and second eyes are associated with the same face. For example, based on known human face geometry, a typical eye distance (e.g., or distance range) may be identified that can be used for a threshold to help determine whether the first and second eyes belong to the same face. In one embodiment, eye size may be utilized when determining the desired distance threshold to use for comparison to an indentified distance between the first and second yes.

In this embodiment, a first eye size comprised in the first indication and a second eye size comprised in the second indication, for example, can be used to identify the desired distance threshold based on known human face geometry. That is, for example, because the sizes of the eyes are known, a typical distance between the eyes for eyes of that size may be identified and used as a threshold. Further, as an example, the distance between the first and second eyes can be compared to the identified distance threshold, to determine whether the first and second eyes are comprised on the same face. Also, the size of the respective eyes may indicate whether the eyes are from the same or a different face. For example, if one eye is substantially larger than the other, then that may be indicative of two separate faces: one in a foreground (or closer to an image capturing device) and one in a background (or further away from an image capturing device).

In one aspect, if the first and second eyes are found to be from the same face, for example, a face region location can be determined based on the eye size and eye location. In one embodiment, when the size and location of both eyes are now known, an aspect (e.g., approximate size) of the face can be more accurately approximated based on known geometries of a human (or non-human) face, for example, by comparing the eye size, eye location, and eye distance to the known geometries. Further, the orientation of the face may be identified based on the orientation of both eyes in the face. In this way, for example, an estimated face region location may be identified, which can comprise a group of pixels in the image, for example.

At 208, if the second eye is not selected (NO at 208), the second eye may be detected, at 210. In one embodiment, a second eye may be detected within a desired distance threshold of the first eye location in the image. In this embodiment, using the first eye size, a desired distance threshold may be determined (as described above), for example, within which the second eye may be found in the image. For example, the size of the first eye may be compared with the known human face geometries to identify a typical range of distance, within which the second eye may be found. In this example, a region in the image surrounding the first eye, equivalent to the distance threshold, may be scanned for the second eye. In this embodiment, for example, the second eye may be detected if an eye is identified within the distance threshold. If the second eye is detected (YES at 210), the face region location may be determined based upon the first indication and the detected second eye, at 214, as described above.

If the second eye is not detected (NO at 210), the face region location may be determined using the location and size of the first eye, at 212. In one aspect, an estimated face region area and location may be identified using information for merely one eye. In this aspect, while the area identified using merely one eye may not comprise the accuracy provided when using both eyes of the face, for example, a general location and approximate face area size may still be determined that is sufficient to improve face detection.

In one embodiment, in this aspect, the size of the first eye may be compared with the known human face geometries to identify a corresponding, approximate face size. In this embodiment, for example, the identified, approximate face size may be used to determine a face region location in the image, where the face region comprises the first eye location. As an example, a typical distance from the first eye to an edge of the face (e.g., determined by the known face geometries) may be used as a radius for the approximate face size. In this way, in this example, even though an orientation of the face may not be known, the approximate face size may incorporate a region in the image that comprises at least a portion of the face, thereby providing the face detection operation with a location from which to work.

At 216 in the example embodiment 200, the face location can be provided to a face detection operation, where face detection can be performed for the image. In one embodiment, the face detection operation may be provided with an indication of the face region location, indicating an area in the image that potentially comprises (an image of) a face. For example, when a face detection application identifies a face in an image, a portion of the image (e.g., that comprises the face region) may be "highlighted" (e.g., cropped, outlined, modified) in a user interface (UI). In this embodiment, for example, the indication of the face region location provided to the face detection operation may comprise a "highlighted" area of the image that comprises an image of the identified potential face location. Alternately, merely a region of the image may be identified to the face detection operation, such as a pixel region or plotted location.

At 218, after the face detection operation is run on the image, comprising the indicated face region location, a face recognition operation may be run on the image. For example, if the face detection operation detected a face in the provided face region location, detected face data may be provided to the face recognition operation. In this example, the face recognition operation may compare the detected face data with data comprising known faces to determine whether the detected face matches a known face. Further, in one embodiment, the known face may be associated with related data (e.g., tags, such as names, locations, descriptive comments), which may be retrieved should a match/recognition occur.

In one embodiment, an indication of a face region location, identified at 214, may be provided to a face recognition component, where the face recognition operation may be run, at 218. For example, a face region location may be identified in the image using the first and second indications, as described above, where the face region location provides information that is sufficient for face recognition. In this way, in one embodiment, the face detection operation may be skipped.

A system may be devised that facilitates face detection, and/or face recognition in an image. For example, face detection operations (e.g., applications) are not always able to detect a face in an image, due to image characteristics and/or a subject's orientation, for example. However, a human viewing the image is more likely to detect a face in the image. Using the ability of humans to detect a face in an image, user input indicated by common image interaction may be used to improve face detection operations.

Figure 3:
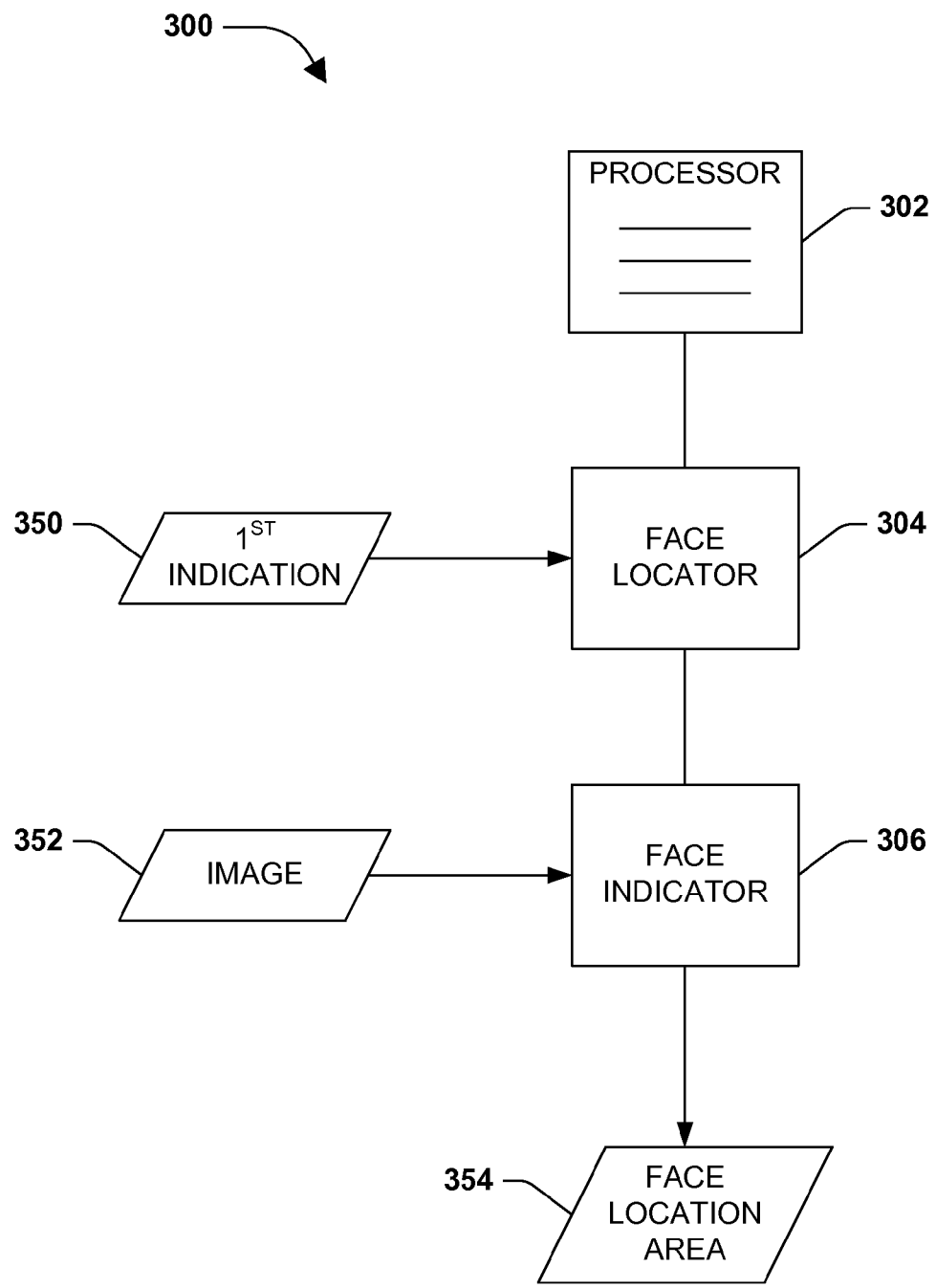
FIG. 3 is a component diagram illustrating an exemplary system for improving face detection in an image.

FIG. 3 is a component diagram illustrating an exemplary system 300 for improving face detection in an image. A computer-based processor 302 is configured to process data for the system 300, and is operably coupled with a face locator component 304. The face locator component 304 is configured to determine a face location area based at least in part upon a first indication 350 of user input, where the first indication 350 comprises a first eye location in the image 352. For example, a user viewing the image 352 may wish to perform image enhancement operations on the image 352, such as to improve image quality (e.g., lighting, color, contrast, other image characteristics).

Further, the user can identify a face in the image 352, where the face comprises at least one eye. The user may select the eye for an enhancement operation, such as red-eye reduction, and the selection of the eye can comprise the indication of the user input, comprising the first eye location in the image 352. The face locator component 304 may be able to use this first indication to determine the location of the face in the image 352, for example, because the user has selected the location of the first eye while interacting with the image 352 during the enhancement operation.

A face indication component 306 is operably coupled with the face locator component 304. The face indication component 306 is configured to identify the face location area 354 in the image 352, that may be used, for example, for a face detection operation on the image 352. For example, a first face detection operation may be run on an image, comprising one or more faces, resulting in some, all or none of the faces detected. In this example, if at least one face is not detected, the face location component 304 may be able to determine the face location area 354 of the at least one face, using the first indication, and the face indication component 306 can provide the image to the face detection operation with face location area 354 indicated in the image. In this way, for example, the face detection operation can perform a second face detection, focusing on the indicated face location area 354 (e.g., that is otherwise overlooked or remains unremarkable relative to the rest of the image).

Figure 4:
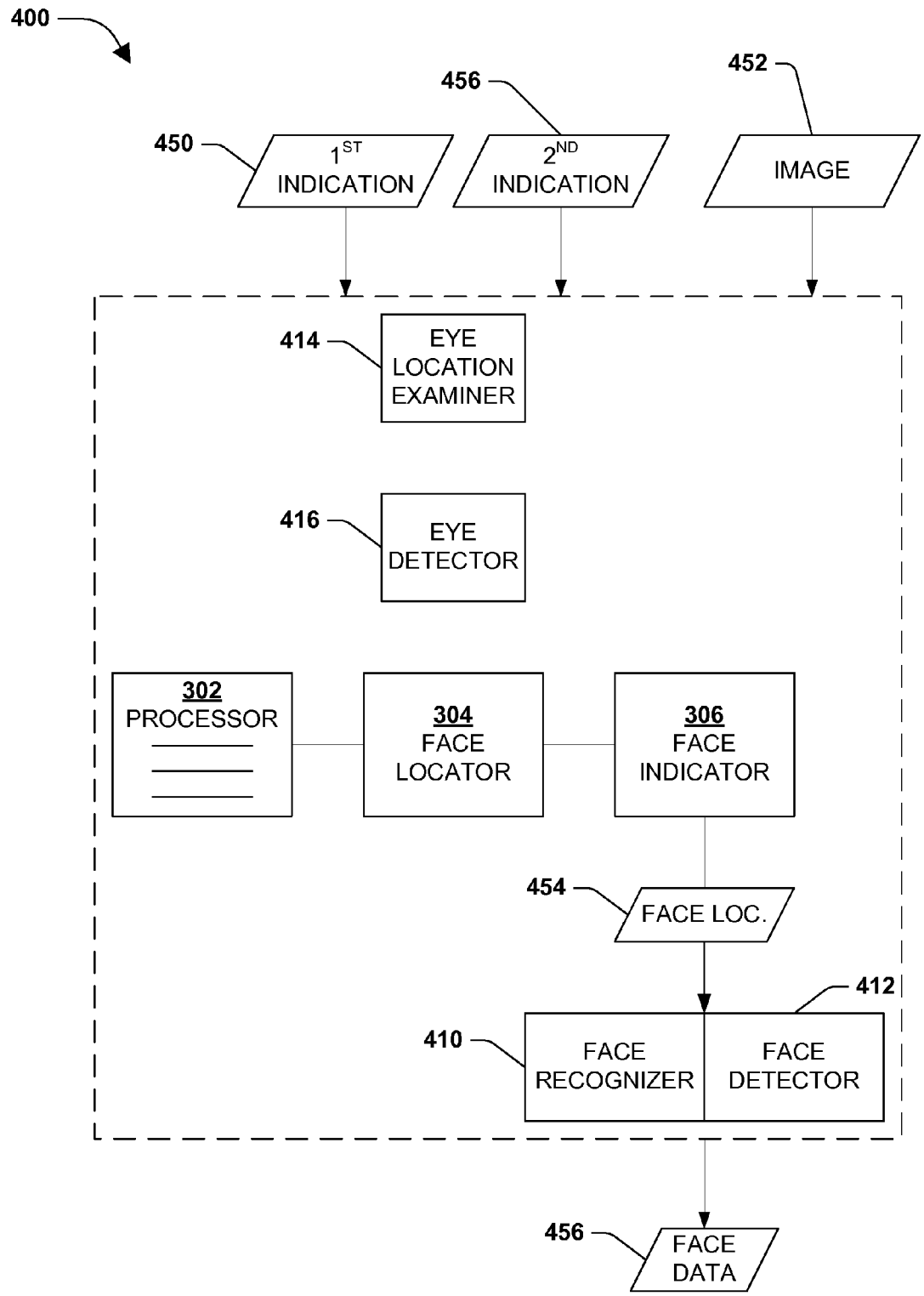
FIG. 4 is a component diagram illustrating an example embodiment 400 where one or more of the systems described herein may be implemented.

FIG. 4 is a component diagram illustrating an example embodiment 400 where one or more of the systems described herein may be implemented. In this example, an extension of FIG. 3 is provided and thus description of elements, components, etc. described with respect to FIG. 3 may not be repeated for simplicity. An eye location examination component 414 can be configured to determine whether a first eye location is comprised in a previously detected facial region.

For example, when an image 452 has been previously run through a face detection operation, one or more faces may have been detected. In this example, a user may select a first eye in the image, where the first eye may be located in one of the one or more detected faces (e.g., for red-eye reduction). The eye location examination component 414 can determine if the user selected first eye, comprised in a first indication 450, for example, is located within one of these previously detected face regions. If the eye location examination component 414 determines that the user selected first eye is located in a previously detected face region, then, in one embodiment, no further action (e.g., additional face detection) may be performed for the first indication 450.

An eye detection component 416 can be configured to detect a second eye in the image 452 based at least in part upon the first indication 450. For example, the first indication 450 can comprise a location of the first eye in the image 452 (e.g., which is not found in a previously recognized face area), and, in one embodiment, may also comprise a first eye size. In this embodiment, the eye detection component 416 may use the first eye location and size information to determine whether the second eye may be found within a desired threshold distance of the first eye. For example, the desired threshold distance can be used to identify that an identified second eye is from a same face as the first eye (e.g., not too far away, an appropriate size, etc.).

In one embodiment, the face locator component 304 can be configured to determine the face location area 454 based on the first indication 450 of user input and a second indication 456 of user input, which comprises a second eye location in the image 452. For example, instead of detecting the second eye, using the eye detection component 416, the user may provide input that identifies the location and/or the size of the second eye in the image 452. The user input identifying the second eye can be comprised in the second indication 456, and, in combination with the first indication 450, may be used to determine the face area location 454, for example, by comparing first and second eye data with known human face geometry data.

A face detection component 412 can be configured to detect a face in the image 452. The face detection component 412 may utilize the identified face location area 454 in the image 452 and/or an adjusted facial recognition threshold to detect the face. In one embodiment, the image 452 may have been previously run through the face detection component 412, for example, where zero or more faces may have been detected.

In this embodiment, if the face indication component 306 indicates a face location 454 in the previously run image 452, the face detection component 412 may still not detect the face if it uses a same facial recognition threshold as was used for the previous run on the image 452. In one embodiment, the facial recognition threshold may be adjusted for use by the face detection component 412, for example, where the adjustment provides for a lowered threshold for face detection. As an example, when face detection is first run on the image 452, there may be "cut-off" constraints that are used to eliminate identified areas in the image 452 as not comprising a face. In this embodiment, for example, when re-detecting, one or more of the cut-off constants (thresholds) that are used to detect a face can be reduced so that the face area location 454 may not be missed a second time. It will be appreciated that lowering one or more thresholds in this manner should not have deleterious effects (e.g., false positives) because the face area location 454 provides a starting point wherein it is much more likely to detect a face (e.g., because a user has identified an eye in this area).

In the example embodiment 400, a face recognition component 410 can be configured to identify data 456 associated with an image of a face in the identified face location area 454 in the image 452. For example, the face recognition component 410 may compare image data from the face location area 454 (e.g., or a face detected by the face detection component 412) with image data of known faces, where the known faces comprise some associated data, such as a person's name or some other identifying information.

As an example, image data for a plurality of known faces (e.g., previously identified) may be stored in a database, and the face recognition component 410 can compare the image data from the identified face area location 454 to the image data in the database. In this example, if a match is found in the database, the face recognition component 410 may retrieve the associated data 456 from the database, and provide it to the user. In this way, for example, the user experience may be improved by automatically providing interesting information to the user (e.g., name of someone next to their face in the image), without the user having to locate the face, and enter the associated information manually. It may be appreciated that such a comparison (of image data) is meant to be interpreted broadly. For example, comparing identified face area image data to database image data may comprise a much more sophisticated comparison than merely comparing two numbers to one another, although it may also or alternatively comprise a less sophisticated/complicated comparison as well.

Figure 5:
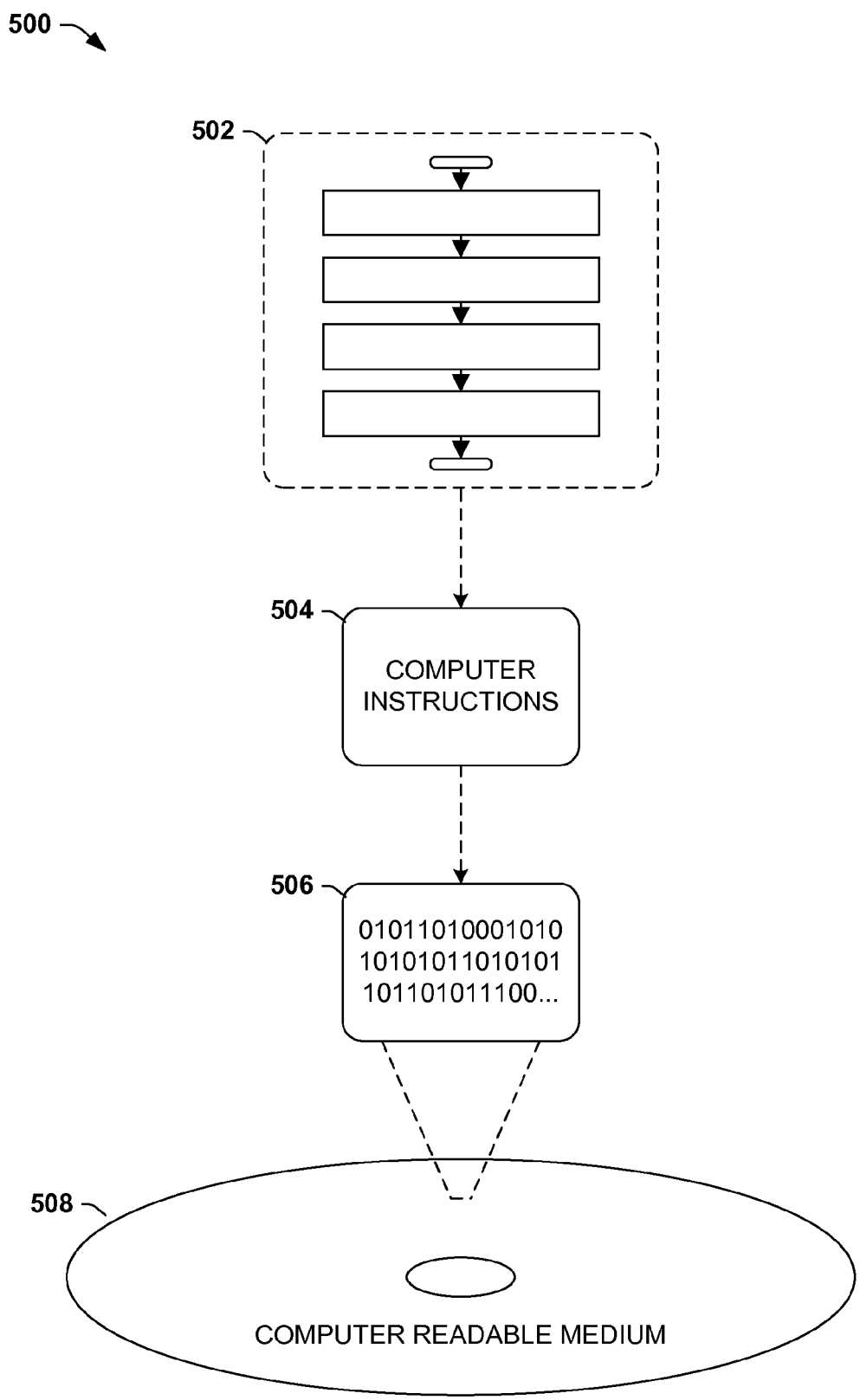
FIG. 5 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 5, wherein the implementation 500 comprises a computer-readable medium 508 (e.g., a CD-R, DVD-R, or a platter of a hard disk drive), on which is encoded computer-readable data 506. This computer-readable data 506 in turn comprises a set of computer instructions 504 configured to operate according to one or more of the principles set forth herein. In one such embodiment 502, the processor-executable instructions 504 may be configured to perform a method, such as at least some of the exemplary method 100 of FIG. 1, for example. In another such embodiment, the processor-executable instructions 504 may be configured to implement a system, such as at least some of the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 6:
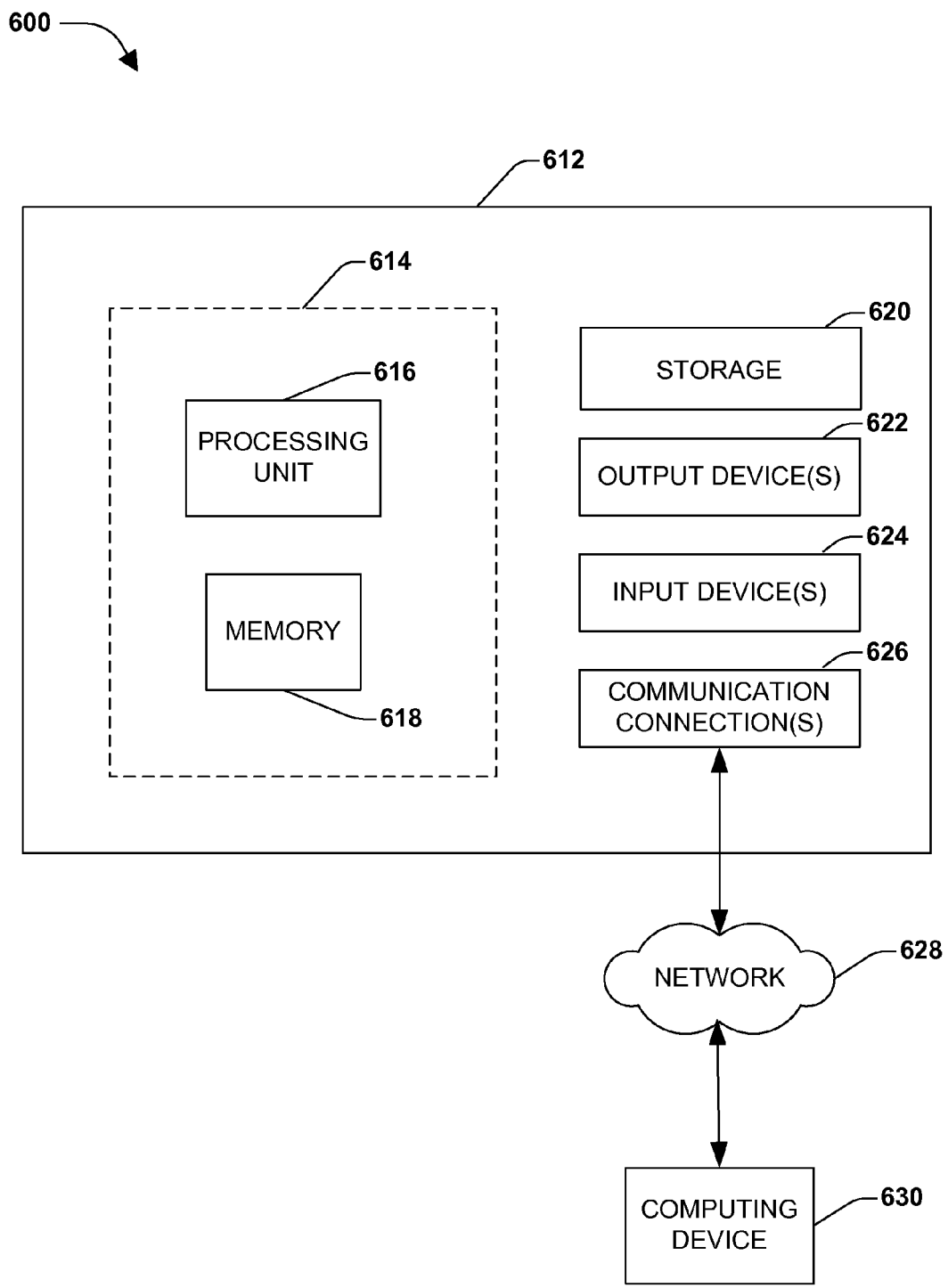
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 610 comprising a computing device 612 configured to implement one or more embodiments provided herein. In one configuration, computing device 612 includes at least one processing unit 616 and memory 618. Depending on the exact configuration and type of computing device, memory 618 may be volatile (such as RAM, for example), non-volatile (such as ROM, flash memory, etc., for example) or some combination of the two. This configuration is illustrated in FIG. 6 by dashed line 614.

In other embodiments, device 612 may include additional features and/or functionality. For example, device 612 may also include additional storage (e.g., removable and/or non-removable) including, but not limited to, magnetic storage, optical storage, and the like. Such additional storage is illustrated in FIG. 6 by storage 620. In one embodiment, computer readable instructions to implement one or more embodiments provided herein may be in storage 620. Storage 620 may also store other computer readable instructions to implement an operating system, an application program, and the like. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 612. Any such computer storage media may be part of device 612.

Device 612 may also include communication connection(s) 626 that allows device 612 to communicate with other devices. Communication connection(s) 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection(s) 626 may include a wired connection or a wireless connection. Communication connection(s) 626 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 612 may include input device(s) 624 such as keyboard, mouse, pen, voice input device, touch input device, infrared cameras, video input devices, and/or any other input device. Output device(s) 622 such as one or more displays, speakers, printers, and/or any other output device may also be included in device 612. Input device(s) 624 and output device(s) 622 may be connected to device 612 via a wired connection, wireless connection, or any combination thereof. In one embodiment, an input device or an output device from another computing device may be used as input device(s) 624 or output device(s) 622 for computing device 612.

Components of computing device 612 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 612 may be interconnected by a network. For example, memory 618 may be comprised of multiple physical memory units located in different physical locations interconnected by a network.

Those skilled in the art will realize that storage devices utilized to store computer readable instructions may be distributed across a network. For example, a computing device 630 accessible via network 628 may store computer readable instructions to implement one or more embodiments provided herein. Computing device 612 may access computing device 630 and download a part or all of the computer readable instructions for execution. Alternatively, computing device 612 may download pieces of the computer readable instructions, as needed, or some instructions may be executed at computing device 612 and some at computing device 630.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for improving face detection in an image, comprising:
   receiving a first indication of user input identifying a first eye in the image, the first indication comprising a user selection of a first eye size of the first eye and a first eye location of the first eye;
   determining whether the first eye is part of a previously detected facial region; and
   responsive to determining that the first eye is not part of the previously detected facial region:

determining whether a second indication of user input identifying a second eye in the image is received, the second indication comprising a user selection of a second eye size of the second eye and a second eye location of the second eye;

responsive to determining that the second indication is not received, determining whether the second eye is programmatically detectable;

responsive to detecting the second eye at least one of programmatically or based upon the second indication:

determining a face location in the image based at least in part upon the first indication and at least one of the second indication or a programmatic detection of the second eye, the face location corresponding to a face region area within the image, and a size of the face region area based at least in part upon a distance between the first eye location and the second eye location;

responsive to not detecting the second eye programmatically or based upon the second indication:

determining the face location in the image based at least in part upon the first indication, the size of the face region area based at least in part upon the first eye size; and indicating the face location in the image for a face detection operation on the image.

2. The method of claim 1, the image comprising a digital image.

3. The method of claim 1, the user input corresponding to a red-eye reduction interaction with the image.

4. The method of claim 1, the determining a face location in the image based at least in part upon the first indication and at least one of the second indication or a programmatic detection of the second eye comprising:

comparing the distance between the first eye location and the second eye location with known facial geometry data.

5. The method of claim 1, the determining a face location in the image based at least in part upon the first indication and at least one of the second indication or a programmatic detection of the second eye comprising:

verifying that the distance between the first eye location and the second eye location is less than a distance threshold.

6. The method of claim 5, comprising determining the distance threshold based at least in part upon at least one of the first eye size or the second eye size.

7. The method of claim 1, the face location centered at the first eye location.

8. The method of claim 1, the indicating the face location for a face detection operation comprising indicating the face region area.

9. The method of claim 1, comprising comparing the first eye size to the second eye size to determine whether the first eye and the second eye correspond to a same face.

10. A system for improving face detection in an image, comprising:

one or more processing units; and memory comprising instructions that when executed by at least one of the one or more processing units perform a method, comprising:

receiving a first indication of user input identifying a first eye in the image, the first indication comprising a user selection of a first eye size of the first eye and a first eye location of the first eye;

determining whether the first eye is part of a previously detected facial region; and responsive to determining that the first eye is not part of the previously detected facial region:

determining whether a second indication of user input identifying a second eye in the image is received, the second indication comprising a user selection of a second eye size of the second eye and a second eye location of the second eye;

responsive to determining that the second indication is not received, determining whether the second eye is programmatically detectable;

responsive to detecting the second eye at least one of programmatically or based upon the second indication:

determining a face location in the image based at least in part upon the first indication and at least one of the second indication or a programmatic detection of the second eye;

responsive to not detecting the second eye programmatically or based upon the second indication:

determining the face location in the image based at least in part upon the first indication; and indicating the face location in the image for a face detection operation on the image.

11. The system of claim 10, the image comprising a digital image.

12. The system of claim 10, the determining a face location in the image based at least in part upon the first indication and at least one of the second indication of a programmatic detection of the second eye comprising:

determining the face location based at least in part upon a distance between the first eye location and the second eye location.

13. The system of claim 12, the determining a face location in the image based at least in part upon the first indication and at least one of the second indication or a programmatic detection of the second eye comprising:

determining the face location if the distance between the first eye location and the second eye location is less than a distance threshold.

14. The system of claim 13, the method comprising determining the distance threshold based at least in part upon the first eye size and the second eye size.

15. The system of claim 10, the method comprising programmatically detecting the second eye in the image based at least in part upon the first indication.

16. A computer readable storage device comprising instructions that when executed perform a method for improving face detection in an image, comprising:

receiving a first indication of user input identifying a first eye in the image;

determining whether the first eye is part of a previously detected facial region; and responsive to determining that the first eye is not part of the previously detected facial region:

determining whether a second indication of user input identifying a second eye in the image is received;

responsive to determining that the second indication is not received, determining whether the second eye is programmatically detectable;

responsive to detecting the second eye at least one of programmatically or based upon the second indication:

determining a face location in the image based at least in part upon the first indication and at least one of the second indication or a programmatic detection of the second eye;
responsive to not detecting the second eye programmatically or based upon the second indication:
determining the face location in the image based at least in part upon the first indication; and
indicating the face location in the image for a face detection operation on the image.

17. The computer readable storage device of claim 16, the face location corresponding to a face region area within the image and the determining a face location in the image based at least in part upon the first indication and at least one of the second indication or a programmatic detection of the second eye comprising:
determining a size of the face region area based at least in part upon a distance between a first eye location of the first eye and a second eye location of the second eye, the first eye location from the first indication and the second eye location from the second indication.

18. The computer readable storage device of claim 16, the face location corresponding to a face region area within the image and the determining the face location in the image based at least in part upon the first indication comprising:
determining a size of the face region area based at least in part upon a first eye size of the first eye as indicated by the first indication.

19. The computer readable storage device of claim 16, the first indication of user input comprising a user selection of a first eye size of the first eye and a first eye location of the first eye.

20. The computer readable storage device of claim 16, the second indication of user input comprising a user selection of a second eye size of the second eye and a second eye location of the second eye.

* * * * *